United States Patent Office 2,848,427
Patented Aug. 19, 1958

2,848,427

METHOD OF MAKING CELLULAR PLASTIC ARTICLES FROM VINYL AROMATIC RESINS

Louis C. Rubens, Midland, Mich., assignor to The Dow Chemical Company, Midland, Mich., a corporation of Delaware No Drawing. Application June 1, 1953
Serial No. 358,962

10 Claims. (Cl. 260—2.5)

This invention relates to the manufacture of cellular plastic articles from vinyl aromatic resins. It pertains especially to a method and normally gaseous agents for foaming a copolymer of a predominant proportion of a monovinyl aromatic compound and a minor proportion of a polyvinyl aromatic compound to form a cellular body.

Cellular thermoplastic resins and methods of making the same are well known. Munters et al. in U. S. Patent No. 2,023,204 have disclosed a method for the preparation of cellular polystyrene which involves heating solid polystyrene and a gas such as methyl chloride in a closed vessel under pressure to a temperature above the fusion point of the polymer, i. e. to about 170° C., to cause absorption of a portion of the gas by the polymer and thereafter opening a bottom valve to permit flow of the polymer from the vessel into a zone of lower pressure, wherein the polymer is swollen by expansion of the gas to form a cellular body. The patent mentions that other gases such as air, carbon dioxide, nitrogen, etc., may be used in place of methyl chloride in its method for forming the cellular product. Cooper in U. S. Patent No. 2,447,055 describes a method of making a cellular body of a polymer such as polystyrene, or polymethyl methacrylate, or copolymers of styrene and methyl methacrylate, wherein the corresponding monomers are incompletely polymerized to form a plastic dough of rubbery consistency which is sheeted out and subjected to a gas under pressure, and thereafter the gas impregnated sheet is heated in a mold, to expand the contained gas and complete the polymerization and form a polymer having sufficient strength to retain its cellular structure. Booth in U. S. Patent No. 2,531,665 describes a process for making expanded thermoplastic articles, wherein a thermoplastic resin such as polystyrene, polymethyl methacrylate, polyethylene, or cellulose esters and ethers, is impregnated with a gas under high pressure at temperatures of the order of 100° to 120° C., cooling the material under pressure, releasing the external pressure, removing the cool material from the pressure vessel and heating the treated material in a closed vessel such as a mold until it is in a soft and plastic state so as to prevent any substantial escape of the gas, then suddenly releasing the pressure whereby the material is allowed to expand. The patent mentions that any inert gas such as air, carbon dioxide, or nitrogen, may be employed in the process.

It has now been found that a slightly cross-linked copolymer of a predominant proportion of a monovinyl aromatic compound such as styrene, vinyltoluene, or ar-dichlorostyrene, and a very small amount, e. g. 0.25 percent by weight or less, based on the weight of the copolymer, of a polyvinyl aromatic compound can readily be expanded to form a cellular body by impregnating the solid copolymer at a temperature below its heat distortion temperature with a normally gaseous agent under pressure until the copolymer absorbs at least two percent of its weight of said agent, releasing the pressure and thereafter heating the treated copolymer containing the absorbed or dissolved normally gaseous agent at a temperature sufficiently above the second order transition temperature of the copolymer, to cause the dissolved normally gaseous agent to expand the copolymer to form a cellular body composed for the most part of individually-closed thin-walled cells.

The heat distortion temperature and the second order transition temperature just mentioned are usually regarded as one and the same. For convenience the term "heat distortion temperature" is preferably used herein and is that determined by a procedure of Heirholzer and Boyer, A. S. T. M. Bulletin No. 134 of May 1945.

It has further been found that resinous compositions comprising a solid slightly cross-linked copolymer of the aforementioned type, e. g. a copolymer of from 99.99 to 99.75 percent by weight of styrene and from 0.01 to 0.25 percent of divinylbenzene, having a normally gaseous agent that is a poor solvent for the copolymer uniformly incorporated therewith, can readily be foamed or expanded at elevated temperatures substantially above the heat distortion temperature of the copolymer to form a cellular body. The foamed copolymers are substantially more resistant to shrinkage and collapse of the cellular body at elevated temperatures above the heat distortion temperature of the copolymer than is polystyrene foamed under similar conditions.

Copolymers of any one or more monovinyl aromatic compounds of the benzene series such as styrene, vinyltoluene, vinylxylene, ar-ethylvinylbenzene, chlorostyrene, dichlorostyrene, ar-chlorovinyltoluene, or isopropylstyrene, and from 0.01 to 0.25 percent of at least one polyvinyl aromatic compound, e. g. divinylbenzene, divinyltoluene, divinylxylene, or ar-ethyldivinylbenzene, may be employed in the process.

It is important that the copolymers contain a minor amount, suitably from 0.01 to 0.25, preferably from 0.03 to 0.2, percent by weight of at least one polyvinyl aromatic compound, e. g. divinylbenzene, chemically combined or interpolymerized with one or more monovinyl aromatic compounds such as styrene, or vinyltoluene, in order that the copolymers can be foamed by the method herein described to form cellular articles composed for the most part of individually-closed thin-walled cells of substantially uniform size, which cellular articles possess good dimensional stability to heat at elevated temperatures, e. g. at temperatures of from 100° to 130° C. or higher.

The copolymers may be prepared in usual ways such as by polymerizing a mixture of the monomers in bulk to form a solid log, bar, or billet, which may be crushed or ground to a granular form for convenience in handling, or by polymerizing a liquid mixture of the monomers while the liquid is dispersed as droplets in an inert aqueous medium. The polymerization is usually carried out at temperatures of from 40° to 150° C. Usually a catalyst such as benzoyl peroxide, ditertiary-butyl peroxide, cumene hydroperoxide, tertiary-butyl hydroperoxide, tertiary-butyl perbenzoate, or alpha,alpha'-azobisisobutyronitrile is added to facilitate the polymerization reaction. The copolymers are normally solid slightly cross-linked resins having an average molecular weight between cross-links in the copolymer molecules, of 20,000 or greater, preferably from 30,000 to 950,000, and are swollen by, but are substantially insoluble in toluene.

The foaming or normally gaseous agent to be employed in the process should be a poor solvent for the copolymer, i. e. it should swell, but not dissolve the copolymer, and it should be capable of rapidly impregnating, or dissolving in, the solid copolymer. The copolymers readily absorb normally gaseous agents such as carbon dioxide, methyl fluoride, ethane, propane, ethylene, or propylene, which are of molecular sizes small enough to enter and leave the interstices between the copolymer molecules, when the solid copolymer is subjected to contact with such agents in liquid or gaseous form under pressure, but they do not readily, rapidly, or extensively, absorb normally gaseous agents of larger molecular sizes, e. g. dichlorodifluoromethane, under similar conditions. The normally gaseous agent should have a molecular weight of from 28 to 44.

The slightly cross-linked copolymer, preferably a granular form, e. g. as granules of sizes from 4 to 100 mesh per inch, is subjected to contact with the normally gaseous agent under pressure at temperatures below the heat distortion temperature of the copolymer. The solid copolymer dissolves or absorbs the normally gaseous agent to form a resinous composition suitable for making cellular plastic articles. The copolymer is usually contacted with the normally gaseous agent in liquid or gaseous form under a pressure of at least 120 pounds, preferably from 200 to 2000 pounds, per square inch, in a pressure resistant vessel and at temperatures of from 20° to 60° C. until the copolymer absorbs at least 2, preferably from 4 to 20 percent by weight of the normally gaseous agent. Thereafter, the pressure is released. The treated copolymer, i. e. the resinous composition comprising the solid copolymer containing the dissolved or absorbed normally gaseous agent, is removed from the vessel as discrete granules or pieces that can readily be poured, or conveniently be handled.

The solid resinous compositions comprising the slightly cross-linked copolymers having the normally gaseous agent dissolved or absorbed therein can readily be foamed to form a cellular mass by heating the same to a temperature above the heat distortion temperature of the copolymer, e. g. at temperatures of from 100° to 185° C. or above, for periods of time such as to result in substantial expansion of the copolymer by the foaming agent to produce a cellular mass, which cellular mass does not rapidly collapse or undergo excessive shrinkage. It may be mentioned that the foaming conditions, i. e. the time and temperature conditions required to expand such resinous composition to form a cellular product, will vary depending in part upon the degree of cross-linking in the copolymer, or the proportion of polyvinyl aromatic compound therein chemically combined with one or more monovinyl aromatic compounds, and also upon the average molecular weight between cross-links in the copolymer molecules. In general, a resinous composition of a normally gaseous agent and a copolymer containing from 0.03 to 0.1 percent by weight of a chemically combined polyvinyl aromatic compound can be foamed by heating at temperatures substantially above the heat distortion temperature of the copolymer, e. g. at temperatures of from 130° to 185° C., to form a cellular product which does not readily collapse or undergo excessive shrinkage prior to expanding the copolymer and cooling the same to a temperature where little if any shrinkage occurs. Copolymers containing a lesser amount of cross-linking, e. g. copolymers of styrene and from 0.01 to 0.02 percent of divinylbenzene, can be foamed to form a cellular product having a greater volume and substantially better resistance to shrinkage at temperatures above the heat distortion temperature of the copolymer than has polystyrene foamed under similar conditions. Copolymers containing a degree of cross-linking corresponding to that produced by the inclusion of from 0.2 to 0.25 percent by weight of divinylbenzene are readily foamed at temperatures of from 100° to 185° C., but rapidly shrink at elevated temperatures e. g. at temperatures of above about 150° C., probably because of an elasticity due to the greater number of cross-links in the copolymer molecules. However, such copolymers can satisfactorily be foamed at temperatures of from 100° to 145° C. by the method herein described. In all instances the slightly cross-linked copolymers can readily be foamed at a temperature within the range of from 100° to 185° C. to form cellular plastic articles having good dimensional stability to heat at temperatures substantially above the heat distortion temperatures of the copolymer, e. g. at temperatures of from 100° to 130° C.

In preparing cellular products the resinous compositions comprising the slightly cross-linked copolymers containing the absorbed normally gaseous agent, are heated to a foaming temperature within the range of from 100° to 185° C. at atmospheric pressure or thereabout, such that expansion of the copolymer occurs to form a cellular mass. The latter is cooled, suitably by rapidly cooling outer surfaces of the cellular mass to a temperature where little if any shrinkage occurs. Thereafter, interior portions of the cellular mass or body may be cooled gradually.

In a preferred practice for the production of cellular articles having a predetermined shape, a mass of a resinous composition comprising a slightly cross-linked copolymer in granular form containing an absorbed normally gaseous agent as herein described, is placed in a mold having a volume of from 2 to 60, preferably from 10 to 40 times the volume of the granular copolymer mass and is heated at a temperature within the range of from 100° to 185° C., such that the dissolved normally gaseous agent expands the copolymer with resultant formation of a cellular product and the product is cooled. The granules of the copolymer usually flow together upon expanding to form a unitary cellular body conforming to the shape of the mold. Such procedure permits the production of a unitary cellular article having a predetermined shape, e. g. a plank, sheet, or panel, composed for the most part of individually-closed thin-walled cells having a continuous outer layer or skin of the copolymer covering an inner mass of individually-closed thin-walled cells. The foamed copolymers or cellular products are useful as insulation in refrigerators and deep freeze units. They are also useful as fillers for life-belts, buoys, and other apparatus designed to be buoyant in water.

The following examples illustrate ways in which the principle of the invention has been applied, but are not to be construed as limiting the scope of the invention.

EXAMPLE 1

A mixture of 99.94 percent by weight of styrene, 0.02 percent of ar-ethylvinylbenzene and 0.04 percent of divinylbenzene, together with 0.5 percent by weight of benzoyl peroxide, based on the weight of the monomers, was sealed in a 0.25 inch internal diameter glass tube and polymerized by heating the same under time and temperature conditions as follows: 3 days at 50° C.; 3 days at 80° C.; and 4 days at 125° C. The copolymer was removed from the tube as a solid glass-like rod. Test pieces having the dimensions 0.25 inch diameter by 0.5 inch long were cut from the rod of the copolymer. These test pieces were placed in a steel bomb and subjected to contact with carbon dioxide gas under 1400 pounds per square inch guage pressure, at a temperature of 35° C., over a period of 24 hours. The pressure was released. The test pieces of the treated copolymer were removed from the bomb. The copolymer absorbed approximately 8 percent by weight of the carbon dioxide. A foaming characteristic for the composition, i. e. the copolymer containing the absorbed carbon dioxide, and a heat stability characteristic for the foam was determined at temperatures as stated in the following table. The procedure for determining the foaming characteristic for the copolymer and the heat stability for the foam was to immerse a test piece of the copolymer containing the dissolved carbon dioxide in an oil bath maintained at a stated temperature and measure the volume of the foam at successive intervals of time. The foaming characteristic for the copolymer is expressed as the ratio of the volume of the foam at successive intervals of time to the initial volume of the test piece of the copolymer. The thermal stability of the foam is expressed as the time in minutes that the foam, after reaching its maximum volume, is heated at the foaming temperature before the volume decreased by shrinkage to one-half its maximum volume at the stated temperature. A convenient way to determine such characteristics is to plot a graph of the volume of the foam versus time, draw a smooth curve through the points and read the corresponding values from the curve. The values given in the following table were determined in such manner. Table 1 gives a comparison of the foaming characteristics and the thermal stability of the foam determined for the copolymer and for polystyrene prepared and foamed under similar conditions. The table identifies each polymer and gives the foaming temperature employed. The table also gives the foaming time in minutes for the test piece of the polymer containing the dissolved carbon dioxide to reach its maximum volume, the ratio of the maximum volume of the foam to the initial volume of the test piece, and the thermal stability of the foam expressed as the time in minutes that the foam was heated at the foaming temperature until its volume decreased by shrinkage from the maximum volume to one-half of the maximum volume. The thermal stability of the foam is greater the longer the time required to shrink to one-half its maximum volume at a given temperature.

EXAMPLE 2

In each of a series of experiments a mixture of styrene, ar-ethylvinylbenzene and divinylbenzene in proportions as stated in the following table, together with 0.5 percent by weight of benzoyl peroxide as polymerization catalyst, was sealed in a 0.25 inch internal diameter glass tube and polymerized by heating the same in accordance with the following time and temperature conditions: 3 days at 50° C.; 3 days at 80° C.; and 4 days at 125° C. The

*Table I*

| Test No. | Foaming Temp., °C. | Copolymer of Styrene Containing 0.04% of Divinylbenzene | | | Polystyrene | | |
|---|---|---|---|---|---|---|---|
| | | Foaming Time Min. | Volume of Foam / Volume of Copolymer | Stability of Foam Min. | Foaming Time Min. | Volume of Foam / Volume of Polymer | Stability of Foam, Min. |
| 1 | 115 | 10 | 33 | 90 | 8 | 30 | 9 |
| 2 | 130 | 7 | 49 | 75 | 3 | 22 | 0.5 |
| 3 | 145 | 5 | 50 | 63 | 2 | 12 | |
| 4 | 160 | 3 | 55 | 22 | 1.5 | 7 | |
| 5 | 172 | 3 | 61 | 23 | 1.2 | 6 | |
| 6 | 185 | 3 | 62 | 16 | .75 | 4 | | copolymer was cooled and removed from the tube as a solid rod. Test pieces having the dimensions 0.25 inch diameter by 0.5 inch long were cut from each rod of copolymer. The test pieces were placed in a steel bomb and subjected to carbon dioxide gas under 1400 pounds per square inch guage pressure at a temperature of 35° C. for a period of 24 hours. Each of the copolymers absorbed approximately 8 percent by weight of the carbon dioxide. A foaming characteristic for each of the copolymers containing the dissolved carbon dioxide was determined by procedure as described in Example 1. Other test pieces of the treated copolymers containing the absorbed carbon dioxide were foamed and the thermal stability of the copolymer foam determined as described in Example 1. Table II identifies each copolymer by giving the proportions of styrene, ar-ethylvinylbenzene and divinylbenzene employed in preparing the same. The table also gives a foaming characteristic expressed as the ratio of the maximum volume of the foam to the initial volume of the test piece of the copolymer. The thermal stability of the foam determined for each copolymer at temperatures as stated in the table is expressed as the time in minutes that the foam, after reaching a maximum volume, is heated at the stated temperature before the volume decreases by shrinkage to approximately one-half of the maximum volume.

*Table II*

| Test No. | Copolymer | | | Foaming Temp., °C. | Foamed Copolymer | |
|---|---|---|---|---|---|---|
| | Percent Styrene | Percent Ethyl-vinyl Benzene | Percent Divinyl Benzene | | Foam Vol. / Initial Vol. | Stability, Min. |
| 1 | 99.955 | 0.015 | 0.03 | 100 | 12.3 | 280 |
| 2 | 99.955 | 0.015 | 0.03 | 115 | 33.1 | 65 |
| 3 | 99.955 | 0.015 | 0.03 | 130 | 49.7 | 54 |
| 4 | 99.955 | 0.015 | 0.03 | 145 | 53.8 | 42 |
| 5 | 99.955 | 0.015 | 0.03 | 160 | 55.3 | 25 |
| 6 | 99.955 | 0.015 | 0.03 | 172 | 56.7 | 21 |
| 7 | 99.955 | 0.015 | 0.03 | 185 | 56.5 | 10 |
| 8 | 99.91 | 0.03 | 0.06 | 100 | 11.1 | 250 |
| 9 | 99.91 | 0.03 | 0.06 | 100 | 31.7 | 100 |
| 10 | 99.91 | 0.03 | 0.06 | 100 | 44.5 | 85 |
| 11 | 99.91 | 0.03 | 0.06 | 145 | 44.8 | 57 |
| 12 | 99.91 | 0.03 | 0.06 | 160 | 45.3 | 21 |
| 13 | 99.91 | 0.03 | 0.06 | 172 | 53.9 | 24 |
| 14 | 99.91 | 0.03 | 0.06 | 185 | 57.6 | 24 |
| 15 | 99.865 | 0.045 | 0.09 | 100 | 10.1 | 190 |
| 16 | 99.865 | 0.045 | 0.09 | 115 | 29 | 88 |
| 17 | 99.865 | 0.045 | 0.09 | 130 | 34.7 | 74 |
| 18 | 99.865 | 0.045 | 0.09 | 145 | 37.4 | 31 |
| 19 | 99.865 | 0.045 | 0.09 | 160 | 42.4 | 41 |
| 20 | 99.865 | 0.045 | 0.09 | 172 | 40.1 | |
| 21 | 99.865 | 0.045 | 0.09 | 185 | 41.6 | 29 |
| 22 | 99.79 | 0.07 | 0.14 | 100 | 8.7 | 236 |
| 23 | 99.79 | 0.06 | 0.14 | 115 | 20.4 | 90 |
| 24 | 99.79 | 0.07 | 0.14 | 130 | 21.1 | 60 |
| 25 | 99.79 | 0.07 | 0.14 | 145 | 30.7 | 13 |
| 26 | 99.79 | 0.07 | 0.14 | 160 | 34.5 | 3 |
| 27 | 99.79 | 0.06 | 0.14 | 172 | 31.1 | 3 |
| 28 | 99.79 | 0.07 | 0.14 | 185 | 28.5 | 0.5 |

EXAMPLE 3

A granular copolymer containing in chemically combined form 99.962 percent by weight of styrene, 0.013 percent of ethylvinylbenzene and 0.025 percent of divinylbenzene, was placed in a stainless steel bomb. The copolymer was in the form of rounded granules having a diameter of approximately 0.25 inch. The copolymer was subjected to contact with carbon dioxide gas under a pressure of 1250 pounds per square inch, at a temperature of 35° C., for a period of 24 hours. The pressure was released and the treated copolymer removed from the bomb. The copolymer contained 9 percent by weight of dissolved carbon dioxide. A charge of 28 grams of the granular copolymer containing the dissolved carbon dioxide was placed in a glass bottle having a capacity of approximately 560 cc. The bottle was placed in an oven maintained at a temperature of 130° C. After a period of 15 minutes, the copolymer had foamed to form a cellular mass that completely filled the bottle. The foamed copolymer was cooled, and removed by breaking the bottle. The product was a cellular body having a continuous outer skin of the copolymer covering an inner mass of individually-closed thin-walled cells. The cellular product did not shrink when heated in an oven at a temperature of 150° C. for a period of one hour.

In contrast, granules of polystyrene of similar size were treated with carbon dioxide under pressure at a temperature of 35° C. for 24 hours. The treated polystyrene contained 9 percent by weight of carbon dioxide. A charge of 28 grams of the polystyrene containing the absorbed carbon dioxide, was placed in a glass bottle having a capacity of approximately 560 cc. The bottle was placed in an oven maintained at a temperature of 130° C. to foam the polystyrene. After 10 minutes in the oven the polystyrene foamed to a maximum volume of only about one-third of the volume of the bottle. The foam was nonuniform and collapsed upon continued heating at a temperature of 130° C.

EXAMPLE 4

A mixture of 99.91 parts by weight of styrene, 0.03 part of ar-ethylvinylbenzene and 0.06 part of divinylbenzene, was polymerized by heating the same in a sealed 0.25 inch internal diameter glass tube under the following schedule of time and temperature conditions: 1 day at 80° C.; 1 day at 120° C.; and 2 days at 150° C. The tube was cooled and the copolymer removed as a solid rod. The rod of copolymer was cut into test pieces 0.375 inch long. These test pieces of the copolymer were weighed and subjected to contact with carbon dioxide gas at a temperature of 35° C. and a pressure of 1250 pounds per square inch over a period of 24 hours. The pressure was released. The test pieces of the copolymer were removed and re-weighed. The copolymer absorbed 9.2 percent of its weight of carbon dioxide. A test piece of the copolymer containing the dissolved carbon dioxide was immersed in an oil bath maintained at a temperature of 130° C. The copolymer foamed to form a cellular mass having a density of 0.038 gram per cubic centimeter in a period of 2.5 minutes. After immersion in the bath for a period of 15 minutes slight shrinking of the cellular mass occurred and its density was 0.041 gram per cubic centimeter. After 30 minutes the density of the foamed copolymer was 0.06 gram per cubic centimeter.

In contrast, a similar test piece of polystyrene was prepared under the same polymerization conditions and treated with carbon dioxide under pressure. It contained 9.3 percent of its weight of dissolved carbon dioxide. The treated polystyrene foamed in the oil bath at 130° C. to form a cellular mass having a density of 0.038 gram per cubic centimeter in a period of 2 minutes. After immersion in the bath for 15 minutes the cellular mass had a density of 0.06 gram per cubic centimeter, and after 30 minutes in the bath had a density of 0.11 gram per cubic centimeter.

The foamed copolymer of styrene and divinylbenzene was far more resistant to shrinking at a temperature of 130° C. than the polystyrene foam at the same temperature.

EXAMPLE 5

A mixture of 99.91 percent by weight of styrene, 0.03 percent of ar-ethylvinylbenzene and 0.06 percent of divinylbenzene, together with 0.5 percent by weight (based on the monomers) of alpha,alpha'-azobisisobutyronitrile, as polymerization catalyst, was sealed in a 0.25 inch internal diameter glass tube and polymerized by heating the same at a temperature of 50° C. The copolymer was removed from the tube as a solid rod. The rod of copolymer was cut into test pieces approximately ⅜ inch long. These test pieces were weighed and maintained in a steel bomb in contact with ethylene gas at a temperature of 35° C. and a pressure of 1000 pounds per square inch gauge, for a period of 24 hours. The pressure was released. The test pieces of the copolymer were removed and re-weighed. The treated copolymer contained 5.82 percent by weight of ethylene. A test piece of the copolymer containing the dissolved ethylene was immersed in an oil bath maintained at a temperature of 100° C. The copolymer foamed to form a cellular mass having a volume approximately 12 times greater than the initial volume of the test piece.

EXAMPLE 6

A mixture of styrene and approximately 0.01 percent by weight of divinylbenzene was sealed in a 0.25 inch internal diameter glass tube and polymerized by heating the same as follows: 1 day at 80° C.; 1 day at 120° C.; and 2 days at 150° C. The tube was cooled and the copolymer removed as a solid rod. The copolymer was cut into test pieces ⅜ inch long. A portion of the test pieces were weighed, placed in a steel bomb and subjected to contact with carbon dioxide under a pressure of 1250 pounds per square inch guage at a temperature of 35° C. for a period of 24 hours. The pressure was released. The test pieces of the copolymer were removed from the bomb and reweighed. The copolymer contained 9.3 percent by weight of carbon dioxide. A test piece of the treated copolymer was foamed by immersing the same in an oil bath maintained at a temperature of 130° C. The copolymer foamed to a cellular mass having a volume approximately 33 times the initial volume of the test piece. The cellular product had a density of 0.03 gram per cubic centimeter. Another test piece of the treated copolymer was foamed by immersing the same in the oil bath at a temperature of 130° C. The copolymer expanded to a cellular mass having its greatest volume in a period of 3.5 minutes, then slowly contracted. After 15 minutes the cellular mass had a density of 0.06 gram per cubic centimeter.

For purpose of comparison polystyrene polymerized under similar time and temperature conditions was treated with carbon dioxide as described above. The treated polystyrene contained 9.3 percent by weight of carbon dioxide. Test pieces of the treated polystyrene foamed to a cellular mass having a density of 0.03 gram per cubic centimeter in 3 minutes at a temperature of 130° C., but after 5 minutes had shrunk to a dense mass.

EXAMPLE 7

A copolymer of 99.962 percent by weight of styrene, 0.013 percent ar-ethylvinylbenzene and 0.025 percent divinylbenzene, in the form of a test piece having the dimensions ¼ inch diameter by ⅜ inch long was placed in a steel bomb and subjected to contact with carbon dioxide at a temperature of 35° C. and 1400 pounds per square inch gauge pressure for a period of 24 hours. The pressure was released and the copolymer removed. It contained 10.8 percent by weight of carbon dioxide. The treated copolymer was immersed in an oil bath maintained at a temperature of 130° C. The copolymer foamed to form a cellular cylinder having approximately the dimensions 1.5 inches in diameter by 2 inches long.

EXAMPLE 8

In each of a series of experiments, a solid copolymer containing in chemically combined form 99.91 percent by weight of styrene, 0.03 percent ar-ethylvinylbenzene and 0.06 percent divinylbenzene, was impregnated with carbon dioxide by subjecting the same to contact with carbon dioxide under pressure as stated in the following table. The procedure for impregnating the copolymer with carbon dioxide was to weigh a piece of the solid copolymer in the form of a ¼ inch diameter rod approximately ½ inch long, then subject the test piece to contact with carbon dioxide under pressure as stated in the table at a temperature of 35° C. for a period of 48 hours. Thereafter the pressure was released and the test piece re-weighed to determine the amount of carbon dioxide absorbed therein. The test piece of the copolymer containing the absorbed carbon dioxide was foamed by immersing the same in an oil bath maintained at a temperature of 130° C. The volume of the foamed copolymer was determined. The table gives the temperature in degrees centigrade, the time in hours and the pressure in pounds per square inch gauge pressure, employed to impregnate each piece of the copolymer, and the percent by weight of carbon dioxide in the treated copolymer. The table also gives a foaming characteristic determined for the copolymer at a temperature of 130° C. The foaming characteristic is expressed as the ratio of the volume of the cellular mass to the initial volume of the treated test piece containing the dissolved carbon dioxide.

Table III

| Run No. | Treating Conditions | | | Percent $CO_2$ Absorbed | Foaming Characteristic Foam Volume |
|---|---|---|---|---|---|
| | Temp., °C. | Time, Hrs. | Pressure, lbs./sq. in. | | Initial Volume |
| 1 | 35 | 48 | 140 | 1.15 | 6 |
| 2 | 35 | 48 | 230 | 2.0 | 10 |
| 3 | 35 | 48 | 230 | 2.77 | 12.2 |
| 4 | 35 | 48 | 400 | 3.51 | 12.4 |

EXAMPLE 9

A charge of 40 grams of a mixture of 99.7 percent by weight of styrene, 0.1 percent ar-ethylvinylbenzene and 0.2 percent divinylbenzene, together with 0.2 gram of alpha,alpha'-azobisisobutyronitrile as catalyst, was polymerized by heating the same in a sealed glass tube at a temperature of 55° C. for a period of 4 days. The tube was cooled and the copolymer removed as a solid rod having a diameter of 0.5 inch. Test pieces of the copolymer were cut from the rod. The test pieces were placed in a steel bomb and subjected to contact with carbon dioxide under a pressure of 1400 pounds per square inch at a temperature of 35° C. for a period of 24 hours. The treated copolymer contained approximately 8 percent by weight of carbon dioxide. A portion of the treated copolymer was immersed in an oil bath maintained at a temperature of 130° C. The copolymer foamed to a cellular mass having a volume 25 times greater than the initial volume of the test piece.

I claim:

1. A process for making a cellular thermoplastic polymer article possessing good dimensional stability at temperatures above the heat-plastifying temperature of the polymer, which process comprises impregnating a solid glass-like copolymer of from 99.75 to 99.99 percent by weight of at least one monovinyl aromatic compound of the benzene series and from 0.01 to 0.25 percent by weight of a polyvinyl aromatic hydrocarbon, with a normally gaseous agent selected from the group consisting of carbon dioxide, methyl fluoride, ethane, propane, ethylene and propylene, by subjecting the solid copolymer to contact with the normally gaseous agent under pressure at a temperature below the heat distortion temperature of the copolymer until the copolymer absorbs at least 2 percent by weight of said agent, releasing the pressure and heating the copolymer containing the dissolved normally gaseous agent to a temperature above the heat distortion temperature of the copolymer, whereby the dissolved normally gaseous agent expands the copolymer to form a cellular product.

2. A process as claimed in claim 1, wherein absorption of the normally gaseous agent in the solid copolymer is accomplished by subjecting the copolymer to contact with the normally gaseous agent under a pressure of at least 120 pounds per square inch at a temperature of from 20° to 60° C.

3. A process as claimed in claim 1, wherein the normally gaseous agent is carbon dioxide.

4. A process as claimed in claim 1, wherein the normally gaseous agent is ethylene.

5. A process for making a cellular thermoplastic polymer article possessing good dimensional stability at temperatures above the heat-plastifying temperature of the polymer, which process comprises impregnating a solid glass-like copolymer of from 99.80 to 99.97 percent by weight of at least one monovinyl aromatic hydrocarbon of the benzene series and from 0.2 to 0.03 percent by weight of divinylbenzene, with a normally gaseous agent selected from the group consisting of carbon dioxide, methyl fluoride, ethane, propane, ethylene and propylene, by subjecting the solid copolymer to contact with the normally gaseous agent under pressure at a temperature below the heat distortion temperature of the copolymer until the copolymer absorbs at least two percent of its weight of said agent, releasing the pressure and heating the copolymer containing the dissolved normally gaseous agent to a temperature above the heat distortion temperature of the copolymer, whereby the dissolved normally gaseous agent expands the copolymer to form a cellular product.

6. A process as claimed in claim 5, wherein the normally gaseous agent is carbon dioxide.

7. A process as claimed in claim 5, wherein the normally gaseous agent is ethylene.

8. A process for making a cellular thermoplastic polymer article having a predetermined shape possessing good dimensional stability at temperatures above the heat-plastifying temperature of the polymer, which process comprises impregnating a solid glass-like toluene-insoluble copolymer composed of a predominant amount of at least one monovinyl aromatic compound of the benzene series and from 0.03 to 0.2 percent by weight of a polyvinyl aromatic hydrocarbon, with a normally gaseous agent selected from the group consisting of carbon dioxide, methyl fluoride, ethane, propane, ethylene and propylene, by subjecting the solid copolymer in the form of discrete particles to contact with the normally gaseous agent under pressure at a temperature below the heat distortion temperature of the copolymer until the copolymer absorbs at least two percent by weight of said agent, releasing the pressure and heating a mass of the granular copolymer at a temperature of at least 130° C. in a mold having a volume of from 2 to 40 times the volume of the granular copolymer mass, whereby the dissolved normally gaseous agent expands the copolymer to form a unitary cellular body conforming to the shape of the mold and cooling the cellular product.

9. A process as claimed in claim 8, wherein the copolymer contains in chemically combined form from 99.80 to 99.97 percent by weight of at least one monovinyl aromatic hydrocarbon of the benzene series and from 0.2 to 0.03 percent of divinylbenzene, based on the weight of the copolymer.

10. A process as claimed in claim 9, wherein the normally gaseous agent is carbon dioxide.

References Cited in the file of this patent

UNITED STATES PATENTS

| | | |
|---|---|---|
| 2,089,444 | Staudinger et al. | Aug. 10, 1937 |
| 2,409,910 | Stober | Oct. 22, 1946 |
| 2,447,055 | Cooper | Aug. 17, 1948 |
| 2,450,436 | McIntire | Oct. 5, 1948 |
| 2,531,665 | Booth | Nov. 28, 1950 |
| 2,537,951 | Amos | Jan. 16, 1951 |
| 2,676,927 | McCurdy et al. | Apr. 27, 1954 |